United States Patent

Paletto et al.

[15] 3,689,683

[45] Sept. 5, 1972

[54] MODULE FOR INTEGRATED CIRCUITS AND METHOD OF MAKING SAME

[72] Inventors: Raimondo Paletto, Milan; Giuseppe Cossuta, San Giovanni, both of Italy

[73] Assignee: Ates Componenti Elettronici S.p.A., Milan, Italy

[22] Filed: Oct. 18, 1971

[21] Appl. No.: 189,887

[30] Foreign Application Priority Data

Oct. 19, 1970 Italy....................31157 A/70

[52] U.S. Cl.................174/52 PE, 29/193.5, 29/588, 174/DIG 3, 174/DIG. 5, 317/234 A, 317/234 E, 317/234 N

[51] Int. Cl.............................................H05k 5/00

[58] Field of Search................................174/DIG. 3, 174/50.6; 317/100, 101 A, 234 E, 234 F, 234 G, 234 N, 234 A; 29/588–589, 193, 193.5

[56] References Cited

UNITED STATES PATENTS

| | | | |
|---|---|---|---|
| 3,614,546 | 10/1971 | Avins | 317/234 E UX |
| 3,629,668 | 12/1972 | Hingorang | 174/DIG. 3 |
| 3,646,409 | 2/1972 | Van de Water et al | 174/DIG. 3 |

*Primary Examiner*—Darrell L. Clay
*Attorney*—Karl F. Ross

[57] ABSTRACT

A coherent metal foil, punched from a sheet to form two sets of conductor strips interconnected by narrow bridges, has a pair of perforated wings by which it is mounted on a pair of upstanding bosses of a metal bar acting as a heat sink. The bar has a central platform onto which a silicon chip bearing integrated circuitry is soldered, with simultaneous soldering of the conductor strips to corresponding terminals of the chip. The central part of the foil, including the wings, is then encased along with the chip in a body of synthetic resin adhering to the underlying bar, leaving free a pair of mounting ears on the bar and the bridge portions of the foil which are subsequently severed to insulate the conductor strips from one another and from the wings.

10 Claims, 5 Drawing Figures

INVENTORS:
Raimondo Paletto
Giuseppe Cossuta
BY
Karl F. Ross
Attorney

Raimondo Paletto
Giuseppe Cossuta
INVENTORS.

BY

Karl F. Ross
Attorney

MODULE FOR INTEGRATED CIRCUITS AND METHOD OF MAKING SAME

Our present invention relates to the manufacture of modular units incorporating integrated circuits.

A typical unit of this type includes a chip of semiconductor material, such as silicon, incorporating integrated circuitry to which external connections are made by an array of conductors joined to respective terminals of the chip. The latter is supported by a massive block or bar, usually of metal, also acting as a heat sink. To hold the conductors in position, and to keep them out of contact with the metallic support, the chip and adjacent conductor parts are encased in a body of synthetic resin adhering to and possibly enveloping the bar or block.

The general object of our present invention is to provide a simple and expeditious process for manufacturing such a unit.

A more specific object is to provide a process for the purpose set forth which precisely locates the several conductors with reference to the heat-dissipating supporting member by purely mechanical means, thus without the need for any special soldering operation aside from the soldering step that may be used to bond the semiconductive chip onto the support.

It is also an object of our invention to provide, as a precursor of the aforementioned modular unit, an intermediate product producible by our simplified process and capable of being adapted to its intended use by the mere severance of bridge portions originally interconnecting the conductors.

These objects are realized, pursuant to our present invention, by providing the heat-dissipating member (preferably a flat bar) with a platform flanked by a pair of upstanding bosses which positively engage a pair of lateral wings forming part, together with an array of conductor strips, of a coherent metal foil; the wings and the strips are initially interconnected by the aforementioned bridge portions which come to lie beyond the outline of the supporting member upon emplacement of the wings on the bosses. In this position, the conductor strips terminate in the vicinity of the platform and can be joined, as by soldering, to the associated terminals of the semiconductive chip resting on that platform; with the chip bonded to the platform, preferably also by soldering, the entire foil is held above the surface of the supporting member substantially at the level of the platform. Next, a mass of synthetic resin is molded or cast about the assembly, leaving free the bridge portions which can thereafter be severed.

Advantageously, the positive interengagement of the foil wings and the supporting bosses is achieved by riveting, i.e., by flattening reduced extensions of these bosses passing through perforations in the wings.

To facilitate the fastening of the modular units to a base, we prefer to let the extremities of the supporting bar project from the resinous body and to provide these extremities with suitable mounting formations, such as a pair of cutouts surrounded by exposed lands which may form seats for the heads of mounting bolts or the like.

The process just described is particularly suitable for manufacturing symmetrical units of the so-called dual-in-line type in which the conductor strips form two sets projecting from opposite sides of the resinous body.

The invention will be described in greater detail hereinafter with reference to the accompanying drawing in which.

Figure 3A:
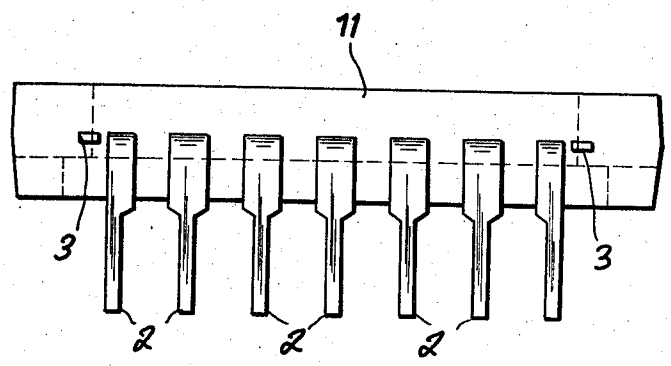
Figure 3B:
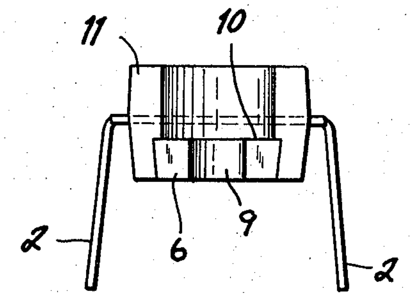

FIG. 3*a* is a side-elevational view of the unit;

FIG. 3*b* is an end view thereof; and

Figure 3C:
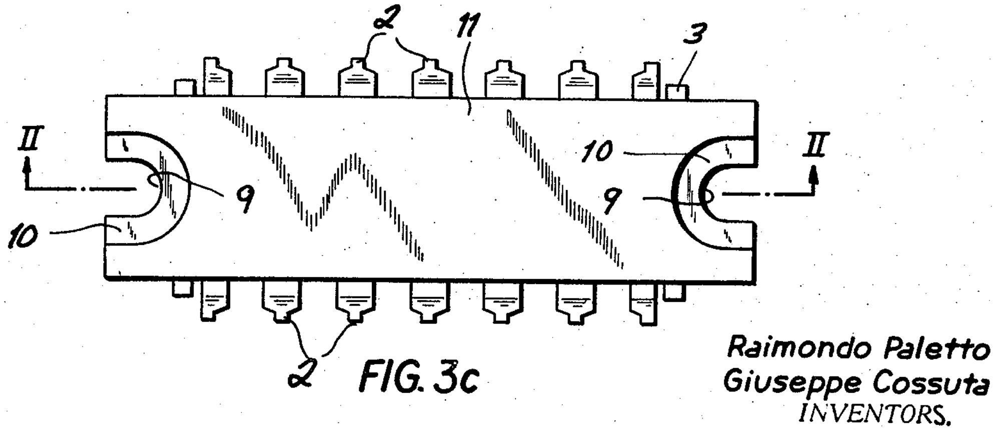

FIG. 3*c* is a top view of same.

Figure 1:
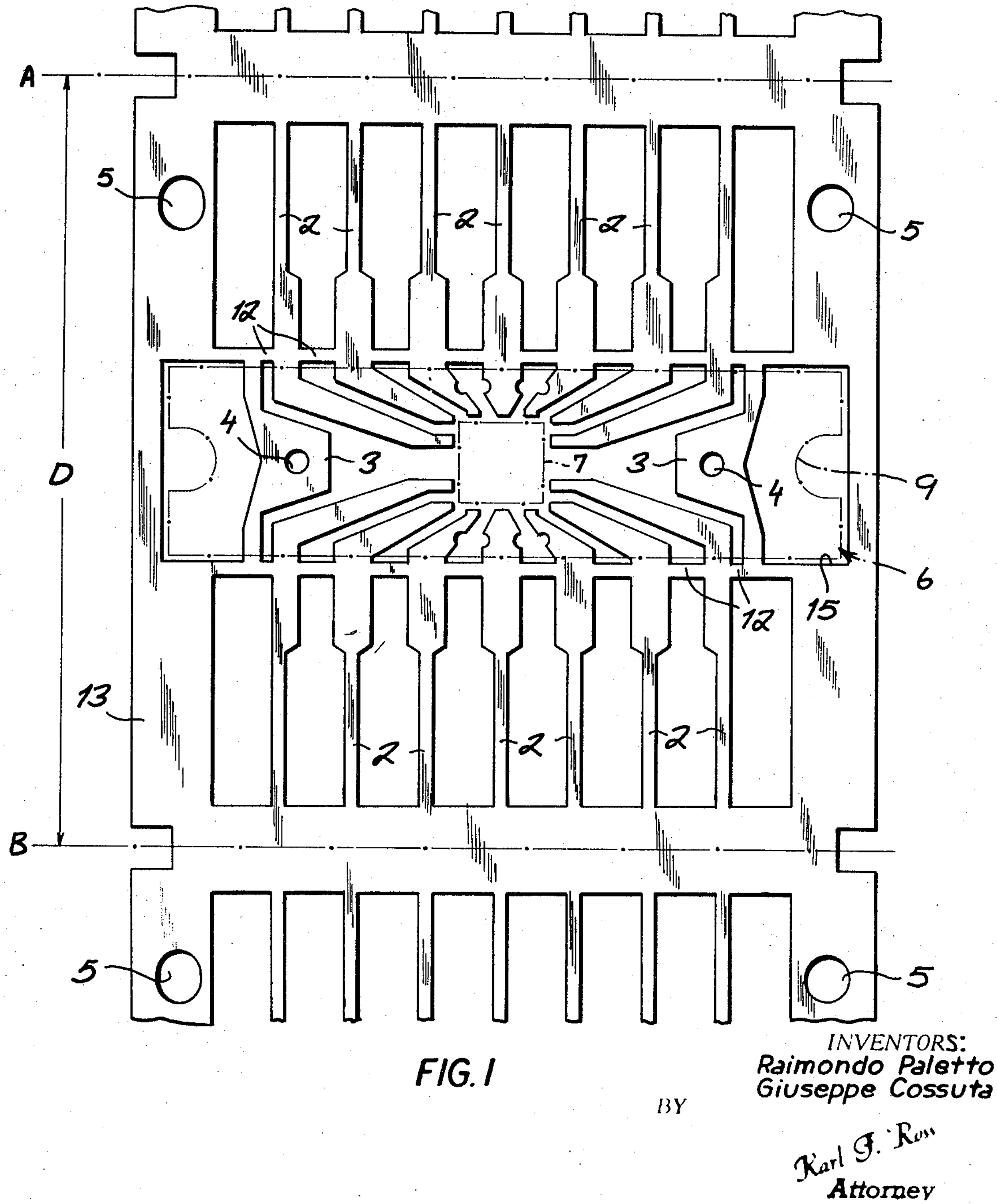
FIG. 1 is a plane view of a metal foil used in manufacturing a modular unit according to our invention.

In FIG. 1 we have shown a sheet 1 of highly conductive metal, such as silver or copper, from which an array of conductive strips 2 and a pair of lateral wings 3 are formed by, for example, punching or etching. The wings 3 have perforations 4 lying on a transverse line of symmetry of a sheet portion of length D representing the aforementioned coherent foil. This foil also has bridge portions 12, integrally connecting the strips 2 and the wings 3 to one another, as well as a marginal zone 13 framing the strips; this marginal zone is formed with a pair of locating holes 5 serving for its accurate positioning on a template.

It will be apparent that the sheet 1 can be cut into a series of identical foils along transverse lines A and B.

Figure 2:
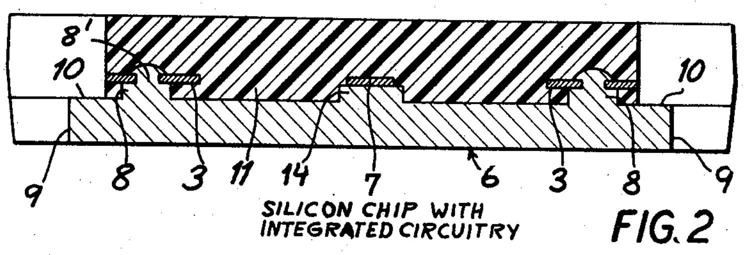
FIG. 2 is a longitudinal sectional view of the finished unit, taken on the line II—II of FIG. 3*c*.

The conductor strips 2 converge at a central cutout, here of square shape, designed to receive a silicon chip 7 (see FIG. 2) bearing the integrated circuitry to be served by these conductors; the chip has been illustrated in dot-dash lines in FIG. 1, along with the outline of a metallic supporting bar 6 of good thermal conductivity, e.g., of copper or aluminum. As illustrated in FIG. 2, bar 6 has a central platform 14 which is slightly larger than the chip 7 resting thereon. A pair of bosses 8, also integral with bar 6, rise to the level of platform 14 and terminate in reduced pins 8' which traverse the perforations 4 of the wings 3 and are peened over to form rivet heads holding the foil in position. Chip 7 may be soldered onto platform 14 before, after or concurrently with the soldering of its terminals to the free ends of conductor strips 2.

The extremities of bar 6 project beyond the wings 3 into the area of a pair of generally rectangular windows 15 of the foil, exposing a pair of cutouts 9 which, as best seen in FIG. 3*c*, are surrounded generally U-shaped lands 10. A body 11 of synthetic resin is then molded around the chip 7 and adjoining parts of the foil including the wings 3 as well as about the major sides of the bar 6, leaving free the ends of the bar with cutouts 9 and lands 10. The bridge portions 12 and the marginal zone 13 of the foil also remain outside the resinous body 11. After the frame 13 has been trimmed off and the bridges 12 have been severed, the outer ends of conductor strips are available for connection to external circuits.

The unit may be fastened to a supporting base, not shown, by bolts received in the cutouts 9, with the bolt heads or associated nuts bearing upon the lands 10 either directly or via interposed washers.

Body 11 may consist of a variety of polymeric materials, e.g., an epoxy resin.

We claim:

1. A process for assembling a semiconductive chip bearing integrated circuitry, an array of conductor strips and a heat-dissipating metallic member into a modular unit, comprising the steps of:

providing said member with a platform and with a pair of upstanding bosses on opposite sides of said platform;

forming said conductor strips as part of a coherent metal foil having a pair of lateral wings alignable with said bosses, said strips being integrally interconnected and joined to said wings by bridge portions coming to lie beyond the outline of said member upon emplacement of said wings on said bosses with said strips terminating in the vicinity of said platform;

positively securing said wings to said bosses;

depositing said chip on said platform in bonded relationship therewith;

joining said strips to respective terminals of said chip;

encasing a portion of said coil including said wings and parts of said strips together with said chip in a body of resinous material while leaving said bridge portions free, said body adhering to said member; and insulating said strips from one another and from said wings by severing said bridge portions.

2. A process as defined in claim 1 wherein said bosses are provided with reduced extensions fitting into perforations of said wings, the latter being fastened to said bosses by flattening said extensions into rivet heads.

3. A process as defined in claim 1 wherein said chip is simultaneously joined to said platform and said strips by soldering.

4. A process as defined in claim 1 wherein said body is molded partly around said member, leaving free a pair of mounting formations on opposite extremities of said member.

5. A process as defined in claim 1 wherein said strips are arrayed in two sets extending from opposite sides of said member upon emplacement of said wings on said bosses.

6. An intermediate product in the manufacture of a modular unit, comprising:

a heat-dissipating metallic member provided with a platform and a pair of upstanding bosses flanking said platform;

a semiconductive chip bearing integrated circuitry, said chip resting on said platform in bonded relationship therewith;

an array of conductor strips connected to respective terminals of said chip, said strips forming part of a coherent metal foil also including a pair of wings resting on said bosses, said strips being spaced from said member and being integrally connected to one another and to said wings by bridge portions lying beyond the outline of said member; and a body of synthetic resin adhering to said member and encasing said chip, said wings and parts of said strip while leaving said bridge portions free.

7. A product as defined in claim 6 wherein said bosses have upward extensions passing through perforations of said wings, said extensions forming rivet heads above said wings.

8. A product as defined in claim 6 wherein said member is a flat bar having two extremities projecting beyond said body, said extremities being provided with mounting formations for fastening said bar to a support.

9. A product as defined in claim 8 wherein said formations are cutouts surrounded by exposed lands.

10. A product as defined in claim 6 wherein said strips are arrayed in two sets projecting from opposite sides of said body at the level of said platform.

* * * * *